United States Patent [19]

Murata et al.

[11] Patent Number: 4,670,791
[45] Date of Patent: Jun. 2, 1987

[54] FACSIMILE METHOD AND SYSTEM FOR PREVENTING THE TRANSMISSION OF A DOCUMENT TO THE WRONG DESTINATION

[75] Inventors: Tsuneo Murata, Hino; Yoshihiro Hirata, Koganei; Toshio Miyagawa, Hino; Fumikazu Nishikawa, Hachioji, all of Japan

[73] Assignee: Tokyo Shibaura Denki Kabushiki Kaisha, Kawasaki, Japan

[21] Appl. No.: 517,705

[22] Filed: Jul. 27, 1983

[30] Foreign Application Priority Data

Jul. 30, 1982 [JP] Japan .................................. 57-132185

[51] Int. Cl.$^4$ ........................ H04N 1/00; H04N 1/32
[52] U.S. Cl. .................................. 358/256; 358/257; 358/280
[58] Field of Search ....................... 358/256, 257, 280; 355/14 CU, 14 SH; 271/4

[56] References Cited

U.S. PATENT DOCUMENTS

| | | | |
|---|---|---|---|
| 4,153,241 | 5/1979 | Batchelor et al. | 271/4 |
| 4,249,216 | 2/1981 | Kanda | 358/257 |
| 4,432,020 | 2/1984 | Omose et al. | 358/257 |

*Primary Examiner*—Edward L. Coles, Sr.
*Attorney, Agent, or Firm*—Banner, Birch, McKie & Beckett

[57] ABSTRACT

This invention is directed to a method and system which employs a distinguishing document placed between each document set which distinguished the documents for one destination from the documents of another destination. In accordance with this invention, the number of documents within each set are counted by counting the documents fed until the distinguishing document is detected, this number is then compared with the number entered in advance for each destination. When a difference between these numbers occurs, it is then determined that double feeding has occurred and a warning is indicated.

14 Claims, 7 Drawing Figures

| JULY 7 | | | |
|---|---|---|---|
| DESTINATION | NUMBER OF SHEETS SET IN ADVANCE | NUMBER OF SHEETS SENT | TIME |
| 0425831111 | 5 | 5 | 13:30 |
| 034255138 | 3 | 2 | 13:32 |

FACSIMILE METHOD AND SYSTEM FOR PREVENTING THE TRANSMISSION OF A DOCUMENT TO THE WRONG DESTINATION

BACKGROUND OF THE INVENTION

This invention relates to a method and system for preventing the transmission of document data to the wrong destination wherein the facsimile apparatus has the capability of automatically sending separate documents to a plurality of respective destinations continuously and in order.

A conventional method of sending document information in a facsimile apparatus is as follows. A plurality of separate documents for transmission to various respective destinations are placed in a holder of a facsimile automatic document feeding device. The documents are placed together in sets, the documents in one set being destined for transmission to one location and the documents in another set being destined for another location. The feeding device automatically feeds the documents for sending each page continuously and in order. Information regarding the destination for each set and the number of documents for each destination are entered into a control unit of the facsimile device. As the documents are being fed, the number of fed pages is counted, and this number is continually compared with the number entered for each destination. As a result of the comparison, the destination of each document to be transmitted is determined. The data corresponding to the information contained on each document is then sent to a receiving fascimile apparatus at the desired destination.

With this conventional method, however, double feeding of documents (i.e., simultaneously feeding of two documents) will produce an erroneous count. In that event, the number of pages counted by the facsimile counter and the number entered in advance for the desired destination will not coincide until pages within the next document set are also sent. As a result, these pages within the next document set will be sent to a wrong destination. In fact, the problem is compounded in that pages within the subsequent document sets will likewise be adversely effected.

SUMMARY OF THE INVENTION

One object of the present invention is to provide a method for preventing the transmission of a document to the wrong destination.

Another object of the present invention is to provide a method to provide a warning when double feeding occurs.

This invention is directed to a method and system which employs a distinguishing document placed between each document set which distinguished the documents for one destination from the documents of another destination. In accordance with this invention, the number of documents within each set are counted by counting the documents fed until the distinguishing document is detected, this number is then compared with the number entered in advance for each destination. When a difference between these numbers occurs, it is then determined that double feeding has occurred and a warning is indicated.

DESCRIPTION OF THE PREFERRED EMBODIMENT

Figure 1:
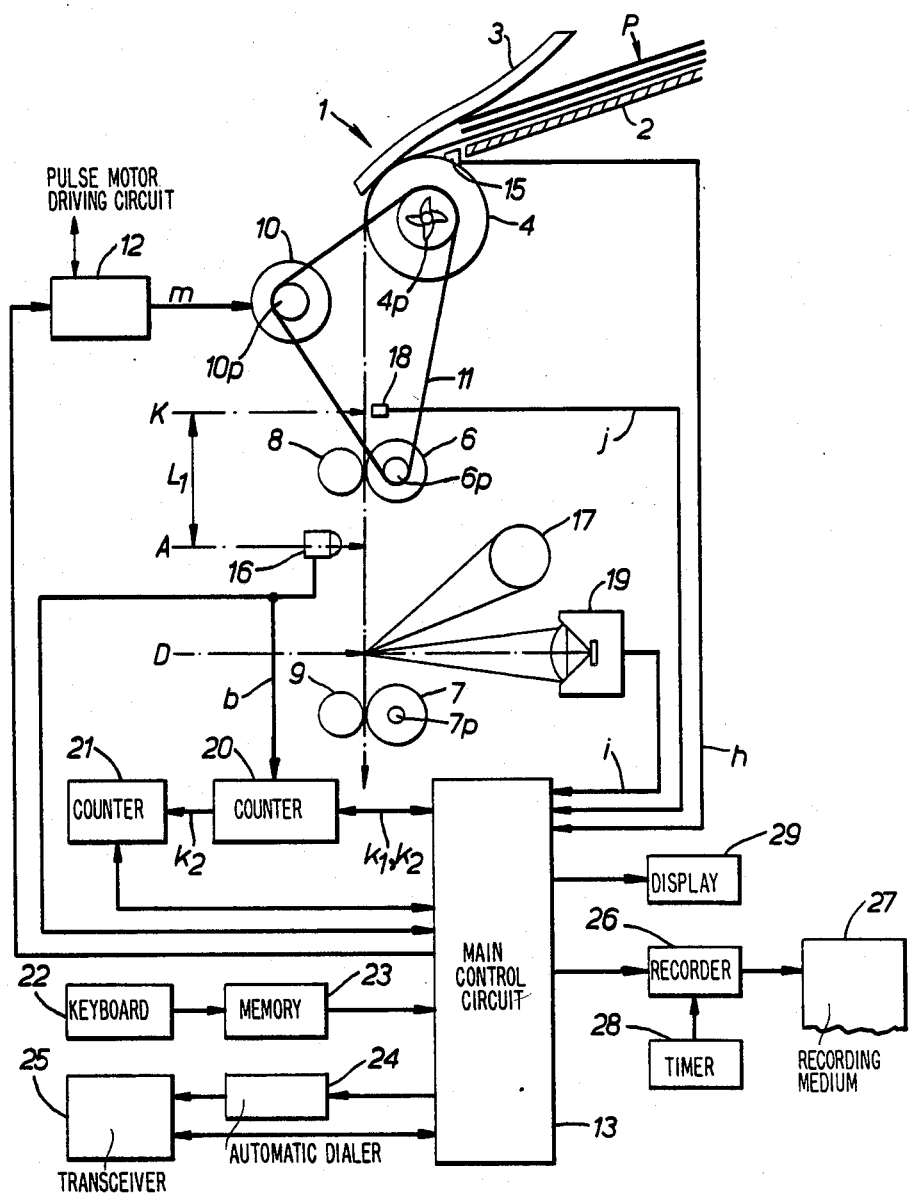
FIG. 1 is a block diagram of the facsimile apparatus embodying the features of the invention.

Referring now to the drawings, the embodiments of the invention will now be explained.

Figures 2, 3:
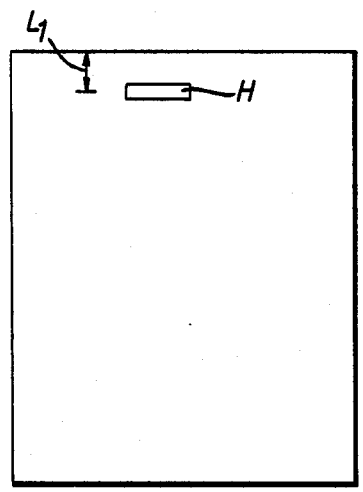
FIG. 2 shows a plan view of a distinguishing document used in accordance with the invention.
FIG. 3 shows a plan view of a portion of a journal document produced in accordance with the invention and summarizing the transmission activity for the documents sent.

FIG. 1 is a block diagram of the facsimile apparatus to which the embodiments of the invention are applied. As shown, an automatic document feeding device 1 comprises a document holder 2, a single document selecting member 3, and an automatic feeding roller 4 having an overrun clutch. The overrun clutch is a one-directional clutch which transmits rotation in only one direction. Documents P compose several sets of documents which are stacked in an up-side-down position on holder 2 and including a distinguishing document which separates the sets C. Each distinguishing document C is inserted between the sets of documents destined for each destination. Each distinguishing document C has hole O at the distance $L_1$ from the top edge of the document, as shown in FIG. 2. In front of the first document which will be transmitted a distinguishing document can be inserted or, if desired, no distinguishing document need be utilized. Selecting member 3 is positioned so that it slightly presses against roller 4 for selecting the documents one-by-one.

Rollers 6, 7 are feed rollers. Pinch rollers 8, 9 are positioned so as to press against rollers 6, 7, respectively. Consequently, each document is pressed firmly against the feed rollers by the action of pinch rollers 8 and 9. Rollers 4, 6 and pulse motor 10 include respective pulleys 4P, 6P and 10P. Pulley $4p$ and pulley $6p$ are connected to pulley $10p$ by a belt 11. Roller 7 includes a pulley $7p$ which is connected to pulley $10p$ by a belt (not shown). Pulse motor 10 is driven by driving pulses m supplied via a pulse motor driving sircuit 12 from main control circuit 13. The relationship among the diameter ratios of roller 4 to its pulley $4p$, feeding roller 6 to its pulley $6p$ and feeding roller 7 to its pulley $7p$ is designed to provide a peripheral speed for roller 4 which is lower than the peripheral speed of rollers 6 and 7. Due to the difference among these speeds, a feeding gap occurs between one document and the next document feed from holder 2.

A micro switch 15 is disposed adjacent roller 4 for detecting whether documents P are placed on holder 2. When no document is placed on holder 2, micro switch 15 is in an off state and the level of its output signal h is H (high). When documents are placed on holder 2, micro switch 15 is in an on state and the level of its output signal h is L (low). Switch 15 comprises, for example, a photocell unit which detects the presence of a document when its activator interrupts its light beam.

A photo-transistor 16 is positioned at position A along the path of the document from roller 4 to roller 7 (via roller 6). Photo-transistor 16 detects whether documents are being supplied along the path. That is, when light radiated from a fluorescent lamp 17 reaches photo-transistor 16 the level of its output signal b will be H (high); however, if the light is interrupted by the presence of a document, the level of its output signal j.

A linear image sensor 19 receives the light radiated from fluorescent lamp 17 and reflected by document P at a point D. Sensor 19 supplies output signals i (i.e., picture signals) according to the amount of reflected light due to the main scanning and sub-scanning of the document.

Clock pulses synchronized with driving pulses m are supplied to a counter 20. The output signal b of photo-transistor 16 is supplied to counter 20. Counter 20 starts to count when signal 6 falls or rises. Counter 20 counts a number equal to the number of driving pulses m which are needed to feed the document from point A to point D. Counter 20 supplies an output signal $k_1$, representing this number, after the fall of b and supplies an output signal $k_2$, representing this number, after the rise of b. Thus, signals $k_1$ and $k_2$ correspond to the time when the top edge and rear edge, respectively, of document P passes point D.

A counter 21 counts the number of documents for transmitting to each destination. It is initialized to the initial value "1" by a signal from main control circuit 13, and counting occurs by the rise of signal b.

A keyboard 22 is utilized to input data. The data entered comprises the telephone numbers of remote facsimile systems at the desired destinations and the number N(I) of documents for each destination. This input data is temporarily stored in a memory 23. An automatic dialing device 24 is utilized to generate the dialing signals corresponding to the telephone numbers of the desired facsimile systems. A transceiver 25 sends signals from main control circuit 13 and automatic dialing device 24 to the remote facsimile systems and receives signals from these systems. A recorder 26 records journal data on a recording medium 27 (FIG. 3) such as telephone numbers of the remote system, the number of documents for each destination entered from the keyboard, the number of documents actually sent to each destination, the time elapsed for sending to each destination and the date the documents were sent.

A timer 28 supplies time information to recorder 26. A display 29 displays the telephone number of the remote facsimile during dialing, and displays an alarm when the number of documents actually sent differs from the number of documents previously entered.

Main control circuit 13 controls and processes the entire operation of the facsimile apparatus. For example, it performs the communication sequence such as originating calls and the pre-transmitting sequence before the information is transmitted, it processes the picture signals i received from linear image sensor 19 and transmits them to the remote facsimile apparatus via transceiver 25. In processing the picture signals i, the control circuit performs a data compression operation (e.g., Modified Hoffman Code); consequently the transmission time for each scanning line will vary according to the amount of information on each line. Thus, the subscanning periods (i.e., paper movement) must likewise be varied for each scanning line; accordingly, it is necessary to vary the period of driving pulses m to pulse motor 10.

Main control 13 also determines if the documents detected by photo-transistor 16 and counters 20, 21 represent all the documents that entered the apparatus. That is, counting value N of counter 21 is compared with the predetermined number N(I) of documents for each set entered from keyboard 22. If the result of the comparison indicates that all the entered documents of a set were not detected, then control 13 activates a portion of display 29 to display an alarm.

Figure 4:
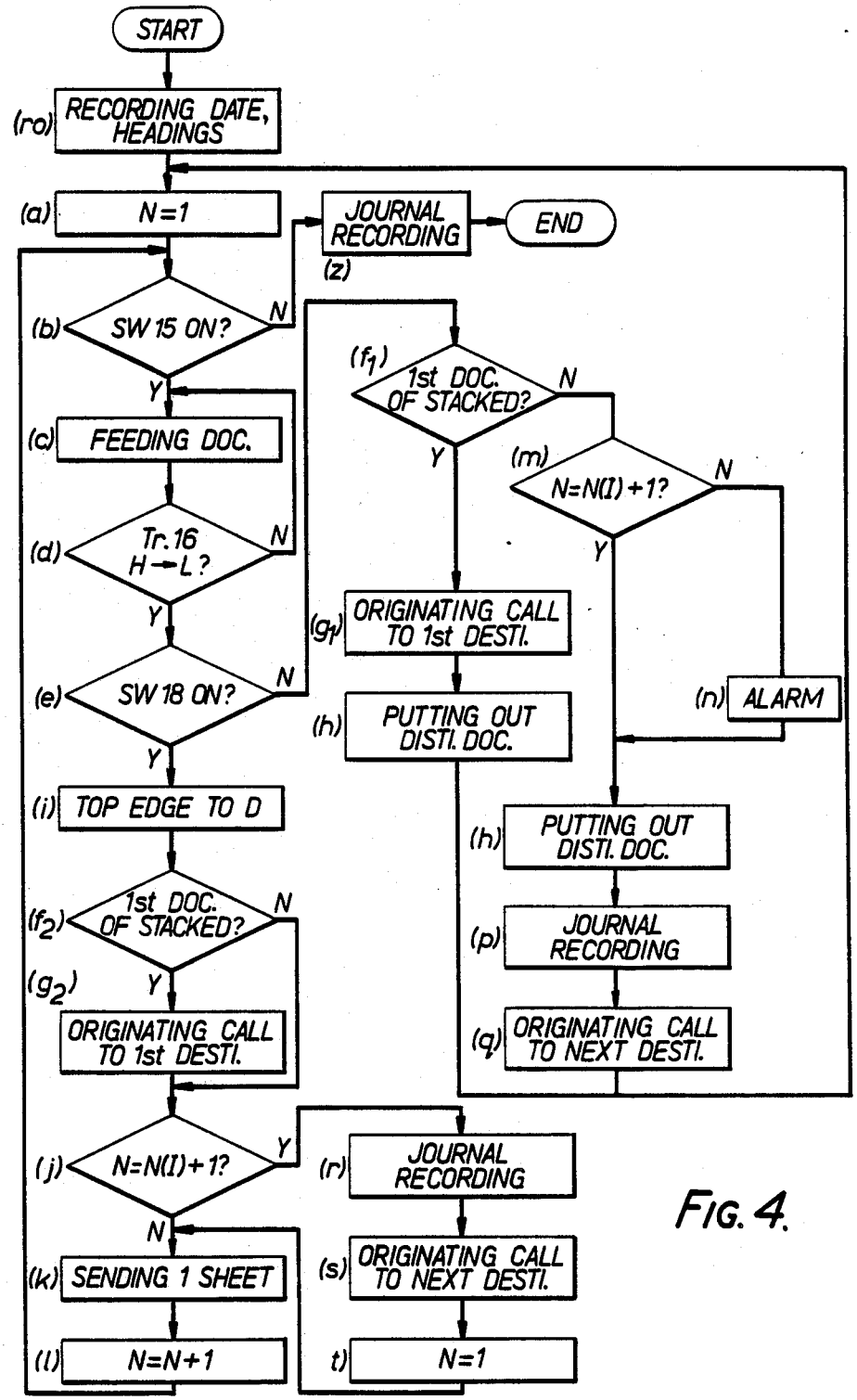
FIG. 4 is a flowchart of one embodiment of the invention.

FIG. 4 is a flow chart showing the action of the facsimile apparatus under control of main control circuit 13. At first, recording date and headings are performed (step ro) and the value N of counter 21 is set to 1 (step a). When documents P are stacked on holder 2, micro switch 15 is turned on and the level of signal h becomes L (step b). Signal h is detected by main control circuit 13. Thus, driving signals m are supplied to pulse motor 10. The first document (i.e., the bottom document) is fed until its top edge reaches position A (step c). At position A, the level of signal b of photo-transistor 16 switches from H to L (step d). The next step determines whether the document is a distinguishing document by detecting the state of micro switch 18 (step e). If it is a distinguishing document, the next step determines whether it is the first document of documents P (step f1). This is determined by sensing whether the document is fed just after the micro switch 15 is turned from off to on. If it is the first document, an originating call to the first destination is performed (step g1) and the distinguishing document is outputted (step h).

The system then returns to step a, and the second document (i.e., the document for transmission) is fed and processed the same way as previously discussed until it reaches step e. At this step, it is determined whether it is a distinguishing document; if not, it is transported until its top edge reaches position D (step i). This transportation is done by supplying driving pulses to step motor 10 until main control circuit 13 receives signal $k_1$. Step f2 determines whether the document is the first document of stacked documents P. If it is not the first document, the counting value N is compared with the entered number N(I) of sheets (step j).

In the event that no distinguishing document is placed before the documents for transmitting to the first destination, the first document of documents P is a document for transmission. Thus, after steps a to e are performed, the systems branches to step f1, rather than to step i. It is, accordingly, determined at step f2 that it is the first document of documents P, an originating call is then sent to the first destination (step g(2)).

As previously discussed, an originating call is made at step g1 or g2 depending on whether a distinguishing document is present.

At the time of the originating call to the first destination, main control circuit 13 reads out the telephone number of the first destination from memory 23, indicates this number on display 29, and initiates automatic dialing device 24 to begin dialing. A dialing signal is sent to the line via transceiver 25, and the calling process is performed. After connection to the remote facsimile apparatus at the first destination, main control circuit 13 performs a tonal sequence before the information is transmitted. Accordingly, to this sequence, the control circuit 13 sends a tone to the remote apparatus which responds, for example, by sending information regarding the type of facsimile apparatus and whether it is ready to receive the information. Then, after this sequence is completed, main control circuit 13 goes on to the next step.

At step j, the value N of counter 21 is compared with the entered number N(I) of the documents for each destination. As long as the distinguishing documents are inserted between the documents for transmitting, the value N will not exceed N(I) during this step; as a result, the system will go to the next step of sending one sheet of information (step k). At this step, the picture signals i are coded by data compression in main control circuit 13 and sent via transceiver 25 to the remote facsimile apparatus. Upon completing the transmission of one sheet of information, signal k2 is supplied to main control circuit 13 which transmits a signal showing that transmission of one sheet has been completed. At the same time, signal k2 is supplied to counter 21 and the counting value N is increased by 1 (step 1). The system then returns to step b and a similar action is repeated concerning the next document for transmission.

When a distinguishing document is detected between the documents for sending to one destination and the documents for sending to the next destination, the system proceeds to step m via step f1. At this step, the counting value N is compared with the entered number N(I). At this time the counting value N indicates the number of documents actually sent plus the distinguishing document. If the feed process occurred without double feeding, then N=N(I)+1. Consequently, the system determines that transmission occurred normally, and proceeds to step h of outputting the distinguishing document. If double feeding occurred, (i.e., N<N-(I)+1), an alarm is displayed on display 29 (step n) and the system proceeds to step h outputting the distinguishing document. Then a journal recording is performed on a recording medium 27 by recorder 26 (step p). The journal recording comprises: the telephone number of the remote apparatus, the number of documents entered in advance, the number of documents actually sent, and the transmission time. Thereafter, an originating call to the next destination is performed (step q) and the system returns to step a and a similar operation is repeated for the next document set.

If all transmission is completed and a distinguishing document is detected behind the last document for transmission, a double feeding comparing step similar to step j is performed for the last destination (step m). Afterwords, the distinguishing document is outputted (step h) and journal recording is performed (step p).

After the last set of documents are transmitted, the originating call step g is not performed since no telephone number corresponding to a next destination exists; as a result, the system returns to step a. Since there are no further documents on holder 2, the system determines that micro switch 15 is off (step b) and journal recording occurs (step z), if not already performed and the processing ends.

On the other hand, if no distinguishing document is detected behind the last document of the last set, the system returns to step b. Since there is no longer a document on hold 2, it is determined that micro switch 15 is off (step b) and journal recording for the last destination is performed at step z and the processing ends. in this case, the double feeding comparing step (step m) is not performed for the last destination.

The apparatus of the present invention also performs conventional facsimile operation without the use of a distinguishing document. In the conventional operation, when transmission to the first destination is finished and the first document for transmission to the second destination is supplied, N will equal N(I)+1 at step j. Thus, the system branches to the journal recording step concerning the first destination (step r). Then, an originating call to the next destination is performed (step s), the counting value N of counter 21 is initialized to 1 (step t), and the system proceeds to step k. The document is transmitted to this destination and the process continues until the last document of the last set is transmitted. Then, journal recording concerning this last destination is performed (step z).

Figure 5:
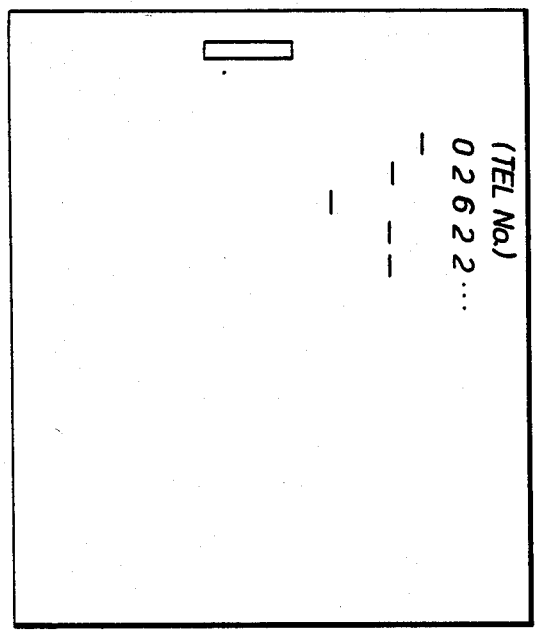
FIG. 5 shows a plan view of another embodiment of a distinguishing document in accordance with the invention.
Figure 6:
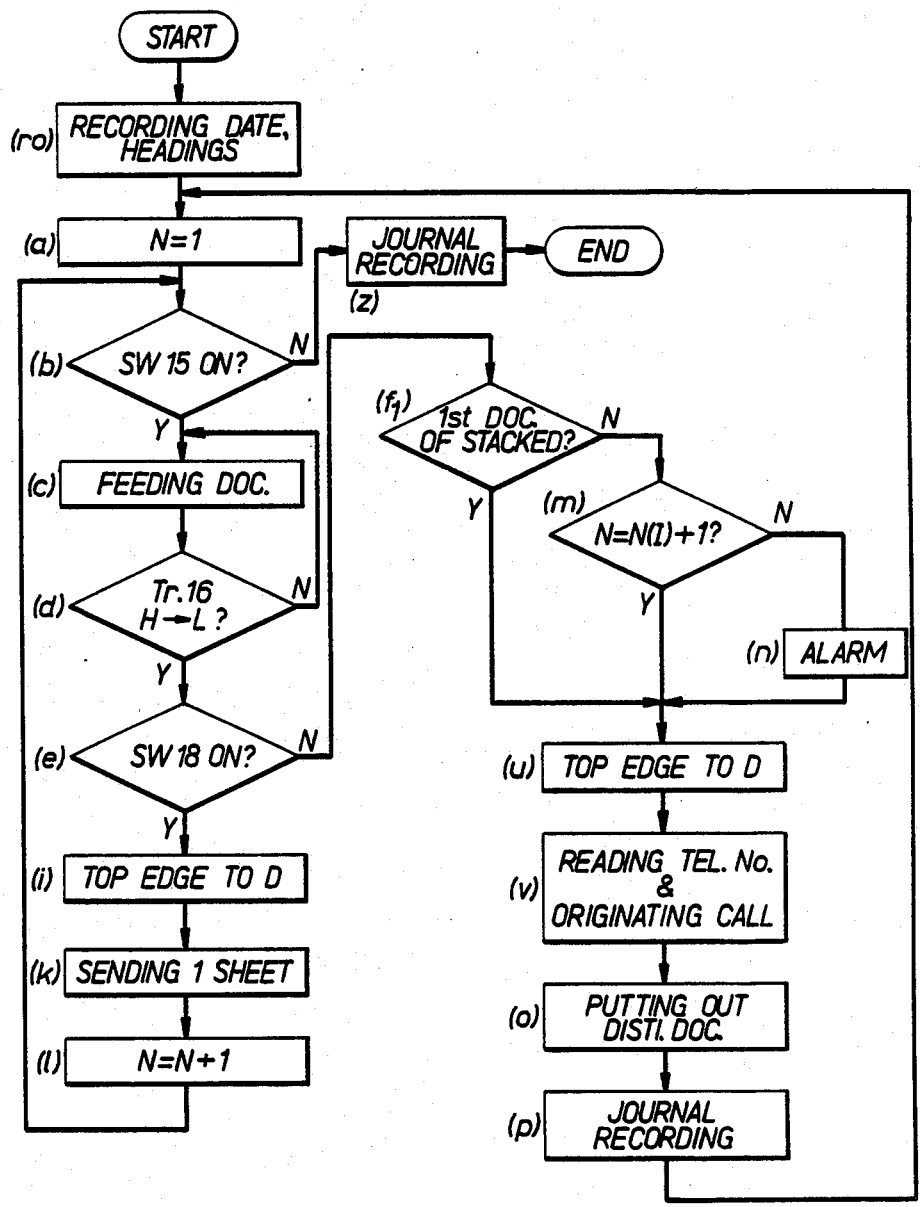
FIG. 6 is a flowchart of another embodiment of the invention.

In the embodiment of FIG. 6, the telephone numbers of destination facsimile apparatuses are detected by reading the distinguishing documents instead of by being supplied by keyboard 22. In this case, only the number of the documents for transmission to each destination are entered by keyboard 22 and stored in memory 23. The telephone numbers for each destination is obtained by reading the marks on the distinguishing documents. The distinguishing documents consisting of OMR (Optical Mark Reading) sheets (FIG. 5) are read by image sensor 19 (FIG. 1). The use of OMR sheets is convenient in the event that documents are frequently sent to the same destination; thus, it is not necessary to enter telephone numbers by the keyboard every time a document or document set will be transmitted.

The flowchart for this embodiment is shown in FIG. 6. Steps similar to those of FIG. 4 have been given the same designation. In this case, it is necessary that a distinguishing document be used as the first document of documents P. That is, before the document for transmission is sent to the first destination, a distinguishing document must be detected. Since each set of documents require a distinguishing document, the steps are simplier than the steps of FIG. 4. That is, there is no need for special processing steps when a distinguishing document is not inserted before the first set of documents. Thus, steps f2, g1 and g2 are omitted in FIG. 6. Step g is also omitted and two steps are utilized in its place. One step transports the distinguishing document until its top edge reaches position D (step u). Another step reads out the telephone number and makes the originating call (step v).

Further, in this case, there is no need for steps q, r, s and t of FIG. 4 since the optional operation of FIG. 4 of sending without the use of distinguishing documents between sets cannot be performed. However, when the conventional operation of not utilizing distinguishing documents is desired, the system of FIG. 6 can be adapted by manually switching to the operation shown in FIG. 4.

Figure 7:
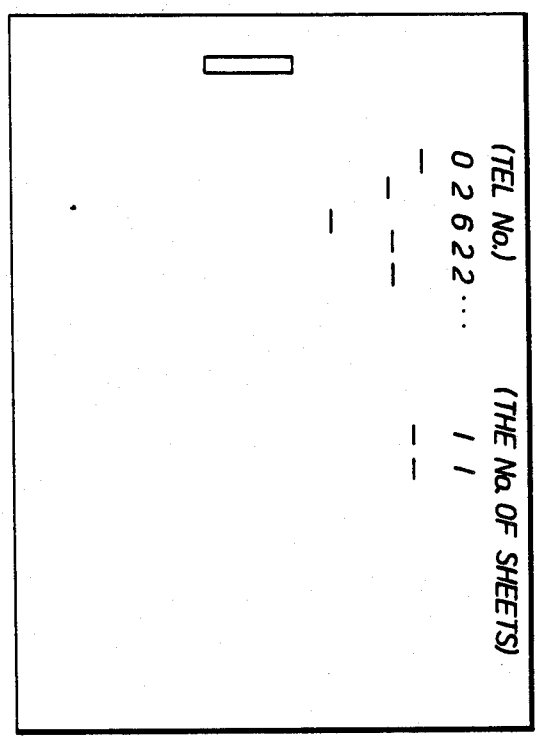
FIG. 7 shows a plan view of a further embodiment of a distinguishing document in accordance with the invention.

In the embodiment of FIG. 7, not only telephone numbers but also the numbers of documents which will be sent to each destination are imprinted on the distinguishing documents. This data is supplied to the system by detecting the information marks on the OMR sheets shown in FIG. 7. In this case, step v of FIG. 6 is modified to the step of reading out a telephone number and the N(I) of documents for each destination and supplying the information to memory 23.

Further, sending the same information to a plurality of destinations is possible. In this case, a large memory is disposed in main control circuit 13 for storing the picture signals. The information obtained from a plurality of documents for transmission is temporarily stored in this memory and then it is transmitted to a plurality of destinations. In this case, step k (FIG. 4 or FIG. 6) is modified to a step of storing one sheet information in the picture memory to one destination or to a plurality of destinations.

Another modification is permitted whereby the method of inputting data from keyboard 22 can comprise pushing ten keys to input the telephone numbers of the remote units, pushing a special character key ("*"), and then pushing ten keys to input the numbers of documents. In this case of designating a plurality of destinations for the same set of documents, the telephone numbers of the desired remote units are successively inputted by pushing the ten keys, each remote unit number being separated by pushing another special key (e.g., "#").

What is claimed is:

1. A method for use in a facsimile apparatus which sequentially processes documents entered into the apparatus for transmitting copies of separate sets of the documents from one destination to respective other destinations, where the number of documents in each document set are predetermined, the method comprising the steps of:
   detecting each entered document of a first document set and providing a count signal corresponding to the number of documents detected;
   processing the first set of entered documents by transmitting a copy of each detected document to a first destination;
   distinguishing the first document set from a second document set and providing a distinguishing signal when said sets are distinguished;
   using said distinguishing signal to determine if all the entered documents of the first set were detected by comparing said count signal with the predetermined number for the first set; and
   activating an alarm if all the entered documents of the first set were not detected.

2. The method of claim 1 wherein the step of distinguishing the first document set from a second document set includes the step of placing a distinguishing document between the first document set and the second document set to maintain the documents in separate sets, detecting said distinguishing document and providing said distinguishing signal when said distinguishing document is detected.

3. The method of claim 2 wherein the step of determining if all of the first set of entered documents were not detected comprises:
   counting the detected documents of the first set until the distinguishing document is detected; and
   comparing the count of the detected documents of the first set with the predetermined number for the first set.

4. The method of claim 2 further comprising the steps of:
   detecting the documents of the second document set upon detection of the distinguishing document; and
   processing the detected documents of the second document set by transmitting a copy of each detected document to a second destination.

5. The method of claim 1 wherein the step of processing the first set of the detected documents comprises the step of automatically originating a call to the first destination.

6. The method of claim 5 wherein the telephone number for the originating call is manually entered from a keyboard associated with the facsimile apparatus.

7. A method for use in a facsimile apparatus which sequentially processes documents entered into the apparatus for transmitting copies of separate sets of the documents from one destination to respective other destinations, where the number of documents in each document set are predetermined, the method comprising the steps of:
   detecting each entered document of a first document set and providing a count signal corresponding to the number of documents detected;
   processing the first set of entered documents by transmitting a copy of each detected document to a first destination;
   determining if all the entered documents of the first set were detected by comparing said count signal with the predetermined number for the first set;
   placing a distinguishing document between the first document set and a second document set to maintain the documents in separate sets;
   entering the distinguishing document and each document with the second document set;
   detecting the distinguishing document by detecting a telephone number on the distinguishing document;
   detecting the documents of the second document set upon detection of the distinguishing document;
   processing the detecting documents of the second document set by transmitting a copy of each detected document to a second destination by automatically originating a call to the second destination in accordance with the telephone number detected in the distinguishing document; and
   activating an alarm if all the entered documents of the first set were not detected.

8. A system for use in a facsimile apparatus which sequentially processes documents entered into the apparatus for transmitting copies of separate sets of the documents from one destination to respective other destinations, wherein the number of documents in each document set is predetermined, the system comprising:
   detecting means for detecting each entered document of a first document set and providing a count signal corresponding to the number of documents detected;
   processing means for processing the first set of entered documents by transmitting a copy of each detected document to a first destination;
   distinguishing means for distinguishing between the first document set and a second document set and providing a distinguishing signal when said sets are distinguished;
   determining means coupled to said distinguishing means for using said distinguishing signal to determine if all the entered documents of the first document set were detected by comparing said count signal with the predetermined number for the first set; and
   display means, coupled to said determining means, for displaying an alarm in the event all the entered documents of the first set were not detected by the detecting means.

9. The system of claim 8 wherein a distinguishing document is placed between the first document set and a second document set to maintain the documents in separate sets and detecting means is provided for detecting said distinguishing document and providing said distinguishing signal when said distinguishing document is detected.

10. The system of claim 9 wherein the processing means further comprises:
   a counting means for counting each detected document of the first set until the distinguishing document is detected; and
   comparing means for comparing the count of the counting means with the predetermined number for the first set.

11. The system of claim 9 wherein the detecting means detects the documents of the second document set upon receipt of a distinguishing document signal from the distinguishing document detecting means indicating the detection of the distinguishing document;
   said processing means transmitting a copy of each detected document of the second set to a second destination in response to said distinguishing document signal.

12. The system of claim 8 wherein said processing means includes means for automatically originating a call to the first destination.

13. The system of claim 12 further comprising a manual entry means for manually entering the telephone number for originating the call.

14. A system for use in a facsimile apparatus which sequentially processes documents entered into the apparatus for transmitting copies of separate sets of the documents from one destination to respective other destinations, wherein the number of documents in each document set is predetermined, the system comprising:
   detecting means for detecting each entered document of a first document set and providing a count signal corresponding to the number of documents detected;
   a distinguishing document located between the first document set and a second document set to maintain the documents in separate sets and a distinguishing document detecting means for detecting the distinguishing document, wherein the detecting means detects the documents of the second document set upon receipt of a distinguishing document signal from the distinguishing document detecting means indicating the detection of the distinguishing document;
   means for detecting a telephone number on the distinguishing document and supplying originating call signals;
   processing means for processing the first set of entered documents by transmitting a copy of each detected document to a first destination, said processing means including determining means coupled to said distinguishing means for using said distinguishing signal to determine if all the entered documents of the first document set were detected by comparing said count signal with the predetermined number for the first set and means for originating a call to the second destination in response to the originating call signals of said telephone number detecting means, wherein said processing means transmits a copy of each detected document of the second set to a second destination in response to said distinguishing document signal; and
   display means, coupled to said determining means, for displaying an alarm in the event all the entered documents of the first set were not detected by the detecting means.

* * * * *